United States Patent [19]

Eley

[11] 4,275,372

[45] Jun. 23, 1981

[54] PROTECTED ELECTRICAL INDUCTIVE APPARATUS

[75] Inventor: Edgar R. Eley, Athens, Ga.

[73] Assignee: Westinghouse Electric Corp., Pittsburgh, Pa.

[21] Appl. No.: 104,645

[22] Filed: Dec. 17, 1979

[51] Int. Cl.[3] ........................ H02H 7/04; H01H 85/16

[52] U.S. Cl. ........................................ 337/4; 337/202; 337/203; 361/41

[58] Field of Search .................... 337/4, 187, 194–196, 337/199, 202–205, 207, 278, 282; 361/41; 174/35, 127

[56] References Cited

U.S. PATENT DOCUMENTS

| | | | |
|---|---|---|---|
| 3,378,627 | 4/1968 | Aldighieri | 174/127 |
| 3,471,816 | 10/1969 | Giegerich | 337/195 |
| 3,480,898 | 11/1969 | Giegerich | 337/4 |
| 3,588,607 | 6/1971 | Ristuccia et al. | 337/201 |
| 3,628,092 | 12/1971 | Keto | 337/202 |
| 3,662,309 | 5/1972 | Harmon | 337/202 |
| 3,699,490 | 10/1972 | Macemon | 337/202 |
| 3,732,517 | 5/1973 | Keto et al. | 337/278 |
| 3,792,215 | 2/1974 | Keto | 337/186 |
| 3,829,810 | 8/1974 | Giegerich | 337/207 |
| 3,892,461 | 7/1975 | Keto | 339/111 |
| 4,010,437 | 3/1977 | Macemon | 337/205 |
| 4,161,012 | 7/1979 | Cunningham | 361/127 |

*Primary Examiner*—William H. Beha, Jr.
*Attorney, Agent, or Firm*—D. R. Lackey

[57] ABSTRACT

Protected liquid-filled electrical inductive apparatus having a dry well fuse assembly which includes a dry well fuse holder sealingly disposed through an opening in the associated metallic casing, separate from the electrical bushings, and a removable fuse portion. Ionization of the air within the fuse holder is prevented by a resilient plug mounted on the removable fuse portion which, when the fuse portion is assembled within the dry well fuse holder, is immediately adjacent to the electrical terminal which is closest to the grounded casing. The resilient plug member provides an air seal adjacent to the terminal without providing a pressure seal within the receptacle.

6 Claims, 6 Drawing Figures

PROTECTED ELECTRICAL INDUCTIVE APPARATUS

BACKGROUND OF THE INVENTION

1. Field of the Invention

The invention relates in general to protected electrical inductive apparatus, and more specifically to liquid-filled pad-mounted electrical distribution transformers having a dry well fuse assembly sealingly mounted through a wall portion of the casing, separate from the electrical bushings.

2. Description of the Prior Art

Protective fuses, such as full range current limiting fuses are used to protect liquid-filled pad-mounted electrical distribution transformers by interrupting fault current flow before peak current is reached. To facilitate fuse replacement without breaking the casing seal, the current limiting fuse may be mounted in a dry well fuse holder which is sealingly disposed through an opening in the casing such that the two electrical terminals or connections to the fuse holder are immersed in the liquid dielectric. The two electrical terminals include portions accessible from within the air space of the dry well fuse holder, and they are configured such that they automatically make electrical contact with the electrical contact portions of the associated removable fuse assembly. The inner portion of one of the electrical terminals is necessarily closer to the grounded metallic casing of the inductive apparatus than the other terminal, and high electrical stresses exist between this terminal and the grounded casing. Ionization of the air within the dry well fuse holder must be prevented, as a flashover may occur along the inside wall of the fuse holder, from the electrical terminal to the grounded casing. With the increasingly higher operating voltages, BIL ratings, and BIL withstand requirements, the spacing between the closest terminal and the casing must be increased, which deleteriously affects the size and thus the cost of the pad-mounted transformer.

SUMMARY OF THE INVENTION

The present invention is a new and improved protected electrical inductive apparatus, such as a liquid-filled pad-mounted distribution transformer, having a dry well fuse assembly which includes a dry well fuse holder sealingly mounted through the casing of the apparatus, independent of the electrical bushings. Two spaced electrical terminals on the fuse holder include portions immersed in the liquid dielectric, for connection between a bushing and a winding of the electrical apparatus, and portions are accessible from within the air space of the fuse holder for connection to the two contact assemblies associated with the removable fuse portion of the assembly. The removable fuse portion includes a resilient plug or sleeve formed of electrical insulating material having a high dielectric strength, such as electrical grade rubber. The resilient plug is configured and dimensioned to provide an air seal immediately adjacent to the terminal which is closest to the grounded metallic casing of the apparatus, without providing a pressure seal. Air passages are defined adjacent to an axially extending opening of the resilient plug, to communicate with air spaces on either end of the plug, enabling the dry well fuse holder to be vented. Electrical gradients exceeding air ionization levels are all within the high dielectric strength body portion of the resilient plug, within the high dielectric strength wall portion of the receptacle, and within the surrounding liquid dielectric.

BRIEF DESCRIPTION OF THE DRAWING

The invention may be better understood, and further advantages and uses thereof more readily apparent, when considered in view of the following detailed description of exemplary embodiments, taken with the accompanying drawings in which.

DESCRIPTION OF PREFERRED EMBODIMENT

Figure 1A:
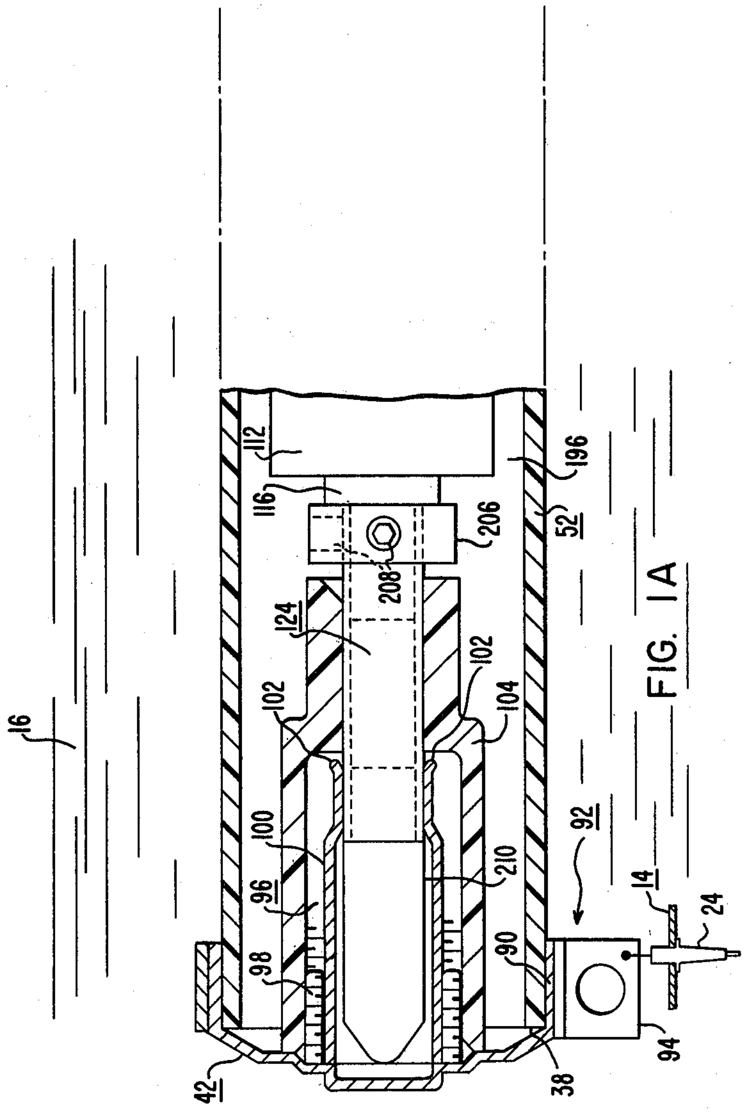
FIGS. 1A and 1B may be assembled to provide an elevational view of protected electrical inductive apparatus, constructed according to the teachings of the invention.
Figure 1B:
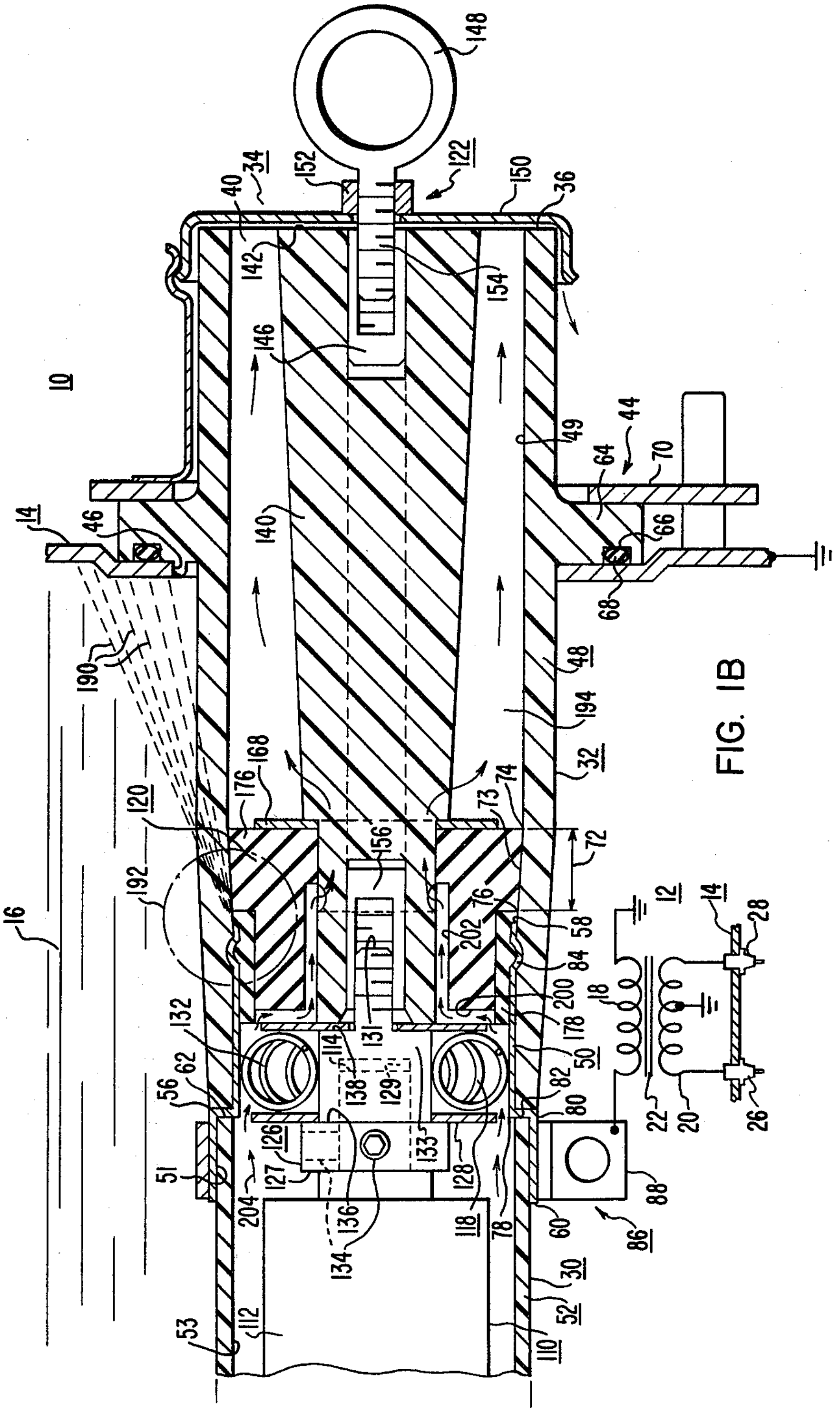

Referring now to the drawing, and to FIGS. 1A and 1B in particular, there is shown a fragmentary, elevational view, partially in section and partially schematic, of protected electrical inductive apparatus 10, such as a liquid-filled transformer of the pad-mounted distribution type, constructed according to an embodiment of the invention. Inductive apparatus 10 includes electrical winding means, such as magnetic core-winding assembly 12, shown schematically, disposed in a grounded metallic tank or casing 14 which is filled to a predetermined level 16 with liquid dielectric means, such as mineral oil.

The magnetic core-winding assembly 12 is immersed in the liquid dielectric, and it includes high- and low-voltage windings 18 and 20, respectively, disposed in inductive relation with the magnetic core 22. One end of the high-voltage winding 18 is connected, via protective fuse apparatus 30, to the encased end of a high-voltage bushing 24, and the other end may be grounded, as shown, or connected to another high-voltage bushing via another protective fuse assembly, as required by the application. The weather end of the high-voltage bushing is adapted for connection to an alternating electrical potential, such as 60 Hz, 14.4 KV. The low-voltage winding 20 is connected to the encased end of low-voltage bushings 26 and 28, and the weather ends of the low-voltage bushings are adapted for connection to a load circuit.

Protective fuse apparatus 30 includes a substantially tubular receptacle 32, and a removable fuse portion 34. Receptacle 32 has first and second ends 36 and 38, respectively, a longitudinal opening, cavity or chamber 40 which extends between its ends, means sealing the second end 38 of receptacle 32, such as a metallic cap member 42 formed of a good electrically conductive material, such as copper, brass or aluminum, and mounting means 44 for sealingly mounting receptacle 32 through an opening 46 in the casing 14. Opening 46 may be located in the front panel of the casing of the associated padmounted electrical distribution transformer. While receptacle 32 extends into the liquid dielectric, it is important to note that protective apparatus 30 is not of the oil circuit breaker type, as opening 40 in receptacle 30 is hermetically sealed from the liquid inside of the tank or casing 14, with the only access to opening 40 being through end 36 from outside the casing 14.

Receptacle 32 is formed of a plurality of tubular members, and in addition to the metallic cap member 42 and mounting means 44, it includes first, second and third axially aligned tubular members 48, 50 and 52, respectively, which provide first, second and third inner surfaces 49, 51 and 53, respectively. The first tubular member 48 has first and second ends 36 and 56, respectively, with end 36 also being the same as the first end of receptacle 32. The second tubular member 50 has first and second ends 58 and 60, and the third tubular member has first and second ends 62 and 38, respectively. The second end 38 of the third tubular member 52 provides the second end of receptacle 32.

The first tubular member 48 is molded of an oil-resistant electrical insulating material, such as a glass-filled epoxy or polyester resin system which may be filled with means such as alumina trihydrate, to obtain arc and track resistance. A circumferential mounting flange 64 may be integrally molded on the outer surface of the first tubular member 48, to form a part of the mounting means 44. Flange 64 may include a groove 66 for receiving an O-ring 68, which, along with suitable clamping means 70, all cooperate to mount and seal the dry well receptacle 32 within opening 46.

It is important to note that the inner surface 49 of the first tubular member 48 is formed compositely by first and second different inside diameters separated by a tapered transition 72. Tapered transition 72 defines a surface 73 having first and second axial ends 74 and 76, respectively. The first inside diameter of the first tubular member 48 defines a surface which starts at end 36 and extends to the first axial end 74 of tapered transition 72. Tapered transition 72 tapers inwardly from end 74 to a smaller inside diameter at its second end 76, with the smaller inside diameter at its second end being equal to the diameter of the second inside diameter of the first tubular member 48. The second inside diameter defines a surface which extends from the second axial end 76 of transition 72, to the second end 56 of the first tubular member 48. The tapered transition 72 is important to the invention, with its importance being described in detail hereinafter.

The second tubular member 50 is formed of a good electrical conductor, such as copper, brass or aluminum, and it has a first inside diameter which defines a surface which starts at its first end 58 and extends to an outwardly stepped transition which includes first and second right angle bends 78 and 80, respectively, and a portion 82 disposed between the right angle bends. The second inside diameter, which is thus larger than the first inside diameter, starts at the second right angle bend 80 and extends to the second end 60 of the second tubular member 50. The portion of the second tubular member which includes the smaller first inside diameter extends into the opening 40 at the second end 56 of the first tubular member 48, and it is sealingly attached thereto. The second tubular member 50 is preferably joined to the first tubular member 48 at the time the first tubular member 48 is molded, in order to provide a tenacious, sealed, oil-tight bond between the two adjoining tubular members. The second tubular member 50 preferably includes an outwardly extending circumferential bulge 84 adjacent to its first end 58, which defines an internal circumferential groove for "locking" the removable fuse portion 34 in assembled relation with receptacle 32, as will be hereinafter explained. This circumferential bulge, ridge or rib also mechanically locks the second tubular member 50 in assembled relation with the first tubular member 48.

The inner surface of the second tubular member 50 defined by the first or smaller of the two inside diameters provides a sliding electrical contact surface of a first electrical terminal assembly 86. The first electrical terminal assembly 86 is completed by a metallic clamp or ring member 88 which is clamped about the outside diameter of the second tubular member, between its second end 60 and the second right angle bend 80. It will be noted that the stepped construction of the second tubular member 50 results in the smaller diameter portion being accessible from within the opening 40 of the dry well receptacle 32, and the larger diameter portion of the second tubular member 50 is accessible from the outside of the receptacle 32. Thus, the ring member 88 is immersed in the liquid dielectric of apparatus 10. Ring member 88 includes means for attaching an electrical lead from an end of the high-voltage winding 18.

The third tubular member 52 is formed of an oil-resistant electrical insulating material, such as a glass-filament wound polyester tube. The wall section of the third tubular member 52 may be uniform and straight, and thus the third tubular member need not be molded, as required for the first tubular member 48. The first end 62 of the third tubular member 52 is telescoped into the opening at the second end 60 of the second tubular member 50, with the outside diameter of tubular member 52 snugly fitting the second inside diameter of tubular member 50. A suitable adhesive joins the second and third tubular members 50 and 52, to provide an oil-tight seal.

As hereinbefore stated, metallic end cap 42 seals the second end of receptacle 32, and thus cap 42 is disposed to seal the second end of the third tubular member 52. As illustrated, cap 42 may be cup-shaped, having a side wall portion 90 which defines an opening having an inside diameter sized to snugly receive end 38 of the third tubular member 52. A suitable adhesive joins the cap 42 and tubular member 52, providing an oil-tight seal therebetween. Cap 42 is part of a second electrical terminal assembly 92, with the external portion of the second electrical terminal 92 being completed by a metallic clamp or ring member 94 which is clamped about the outside diameter which defines the side portion 90 of the cup-shaped cap 42. Ring member 94, which is immersed in the liquid dielectric, includes means for attaching an electrical lead which extends to the electrical bushing 24.

The second electrical terminal 92 also includes an inner portion 96 suitably constructed to make electrical contact with a contact assembly of the removable fuse portion 34. For example, inner portion 96 may include a tubular cylindrical metallic member 98, formed of a suitable electrical conductor, such as copper, brass or aluminum, which has one axial end thereof brazed or otherwise mechanically and electrically connected to the inside surface of the base of metallic cap member 42. The inside diameter of member 98 may be threaded, and a suitable tubular type metallic pressure terminal or contact 100 may be threadably engaged therewith. Tubular contact 100 is threaded on its outside diameter adjacent to one of its axial ends, and the remaining end portion is longitudinally slotted to provide a plurality of outwardly extending fingers 102 sized to make pressure contact or engagement with a probe contact assembly on the removable fuse portion 34, as will be hereinafter explained. If protective fuse apparatus 30 is required to also provide a load-break function, eliminating the need for an auxiliary load-break switch, a tubular insulating member 104 formed of a suitable arc extinguishing material may be disposed to surround contact member 100. For example, the outside diameter of member 98 may also be threaded, and the inside diameter of a tubular insulating member 104 may be cooperatively threaded adjacent to one of its axial ends for assembly with member 98. The remaining axial end of insulating member 104 is sized to snugly receive the probe contact and a cooperative probe formed of arc extinguishing material on the removable fuse portion 34, as will be hereinafter explained.

There are many different insulating materials which possess arc extinguishing characteristics, as opposed to arc tracking characteristics, with the arc extinguishing materials producing gases when being subjected to the heat of an arc, which gases expand to blast, cool and deionize an arc. Further, the byproducts of a good arc extinguishing material will not track or create a path for electrical current to flow. For example, the arc extinguishing members of protective fuse apparatus 30 may be formed of a high molecular weight polyoxylmethylene, as described in U.S. Pat. No. 3,059,081.

The removable fuse portion 34 of apparatus 30 includes a fuse 110, which is preferably a fuse of the full-range, current limiting type. Suitable fuses of the current limiting type are disclosed in U.S. Pat. Nos. 2,496,704; 2,502,992 and 3,134,874, for example. The full-range current limiting fuse provides protection for the feeder system against faults in the electrical inductive apparatus, with the current limiting fuse extinguishing the arc at the designed let-through current, and it also protects the electrical inductive apparatus 10 against short circuits and long-time overloads in the connected load circuit. It also protects operating personnel, as the current limiting fuse may be safely connected into a circuit having a low-impedance fault, as the current limiting fuse clears the circuit without initiating hazardous operating conditions.

Current limiting fuse 110 includes an insulating fuse tube 112 and first and second metallic electrodes 114 and 116 suitably attached thereto. First electrical contact means 118, a resilient plug or sleeve member 120, and operating handle means 122, form an assembly to which the first metallic electrode 114 is secured. Second electrical contact means 124 is secured to the second metallic electrode 116.

More specifically, the first electrical contact means 118 includes a metallic adapter 126, first and second metallic washer members 128 and 130, respectively, and a garter or coil spring 132. Adapter 126 is an elongated structure formed of a good electrical conductor, such as copper, with a first axial end 127 having an opening 129 sized to receive the end of fuse electrode 114. Set screws 134 disposed through the side wall which defines opening 129 are advanced against electrode 114 and securely tightened. The first washer 128, which is formed of a suitable metal such as stainless steel, is disposed over the second axial end 131 of adapter 126, against a first shoulder 136. The garter spring 132 is disposed about an intermediate portion 133 of adapter 126, and the second washer 130 is disposed over the second axial end 131 of adapter 126, against a second shoulder 138. The garter spring 132 is thus disposed between the spaced washer members 128 and 130. The remaining axial end 131 is in the form of a threaded stud, enabling it to be threadably fixed to the operating handle means 122.

Figure 3:
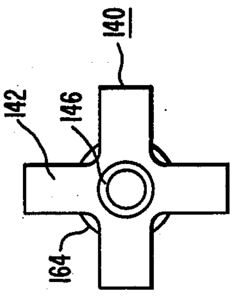
FIG. 3 is an end view of the operating rod shown in FIG. 2.

Operating handle means 122 includes an elongated insulating rod member 140 having first and second axial ends 142 and 144, respectively. Rod member 140, which is shown in side elevation in FIG. 2, and in a right hand end view in FIG. 3, is formed of a suitable electrical insulating material, such as a glass-filled polyester. The first axial end 142 includes a threaded metallic insert 146 embedded therein for receiving an eye-bolt 148, and cap or cover 150. A nut 152 is threadably engaged with a threaded stud portion 154 of eye-bolt 148, and cap 150 is threadably engaged with stud 154 until it is butted up against the side of nut 152. The threaded stud 154 is then threadably engaged with the threaded insert 146 which is fixed in the first axial end 142 of the insulating rod member 140.

The second axial end 144 of insulating rod member 140 includes a threaded insert 156 secured therein, with the threaded first axial end 132 of adapter 12 being threadably engaged therewith.

Figure 2:
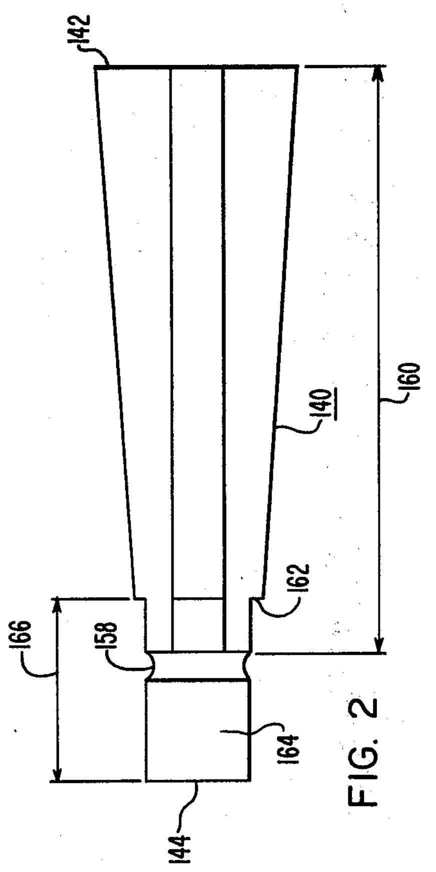
FIG. 2 is a view in side elevation of an insulating operating rod or handle for a removable fuse portion of the apparatus shown in FIG. 1.

As shown most clearly in FIGS. 2 and 3, insulating rod member 140 has a cruciform cross-sectional configuration which extends from its first end to an annular groove 158, with the longitudinal length of this cruciform section being indicated by dimension 160 in FIG. 2. The four outwardly extending arms of the cruciform cross-sectional configuration taper inwardly from end 142 until reaching a shoulder 162. The portion of insulating rod member 140 from shoulder 162 to end 144 includes an untapered cruciform cross-sectional configuration from shoulder 162 to annular groove 158, and a portion 164 which extends from groove 158 to end 144, which has a circular configuration.

The resilient plug or sleeve member 120 is mounted on insulating rod member 140, such that it extends over the round portion 164, the annular groove 158, and the portion of the rod member 140 between groove 158 and shoulder 162 which has a cruciform cross-sectional configuration, as indicated by dimension 166. A metallic washer member 168 is disposed on insulating rod member 140, against shoulder 162, to provide a metallic stop or back-up for resilient plug member 120, and the resilient plug member 120 is disposed over end 144 of insulating rod member 140 prior to the step of threadably engaging insert 156 and threaded end 131 of adapter 126.

Figure 4:
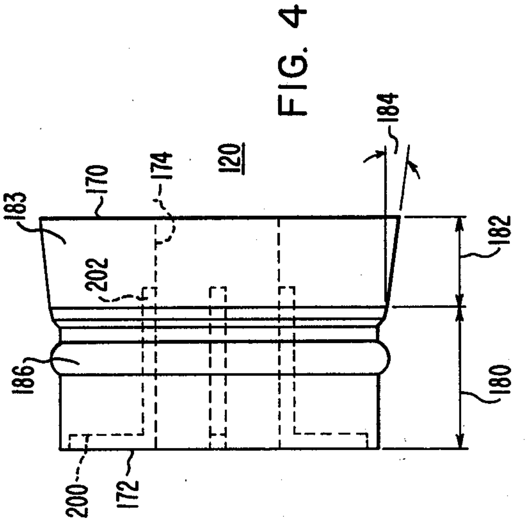
FIG. 4 is a view in side elevation of a resilient plug or sleeve member, which is shown in section in FIG. 1.
Figure 5:
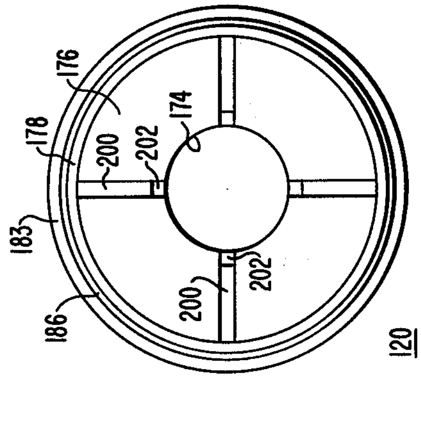
FIG. 5 is a left-end view of the resilient plug member shown in FIG. 4.

Resilient plug member 120, which is also shown in an elevational view in FIG. 4, and in a left hand end view in FIG. 5, has first and second axial ends 170 and 172, respectively, and an axially extending opening 174 which extends between its ends. Opening 174 is sized to enable resilient plug member 120 to be telescoped over end 144 of insulating rod member 140 until it contacts back-up washer 168. Resilient plug member 120 is a composite structure having a major portion 176 formed of a good electrical grade of insulating rubber, such as EPDM rubber, and an integrally bonded external portion 178 formed of partially conductive rubber, such as rubber having carbon added thereto to provide an electrical conductivity of a few thousand ohms per square. Portion 178, which may have a thickness dimension of about 3/16 inch, is disposed to provide a partially conductive outer surface which extends from end 172 for a dimension 180 which is sufficient to extend just past end 58 of the second tubular member 50, such as about ⅛ inch, when the removable fuse portion 34 is in assembled relation with receptacle 32. The remaining outer surface, from the end of the partially conductive surface to the first axial end 170, indicated by dimension 182, is an insulating surface provided by portion 176 of the composite structure.

It should be noted that the insulating surface 183 indicated by dimension 182 is tapered, starting with the largest outside diameter at end 170 and smoothly tapering inwardly. The angle of the taper, indicated at 184, may be the same as the angle of the taper of surface 73 which extends from axial dimension 72, on the inner wall of the first tubular member 48. While the angles of the two tapers are the same, the diameter of the taper on the resilient plug member 120, at any selected point, is slightly larger than that of the molded first tubular member 48, in order to compress the resilient plug member 120 and provide an air-free interface between the mating tapered surfaces.

It should also be noticed that while the partially conductive surface indicated by dimension 180 is primarily in the shape of a right cylinder, that it does have a raised portion in the form of a circumferential rib 186. Rib 186 is dimensioned and located such that when the removable fuse portion 34 is assembled with receptacle 32, the circumferential rib 186 will be compressed until reaching the circumferential groove provided by the circumferential bulge 84 in the second tubular member 50. Rib 186 snaps into this groove, "locking" the removable fuse portion 34 in assembled relation with the receptacle 32.

As illustrated in FIG. 1, the partially conductive surface of resilient plug member 120 contacts the inner wall of the metallic tubular member 50, at a point intermediate its axial ends, and it then extends outwardly past end 58 of the metallic tubular member 50. The partially conductive surface, being at substantially the same electrical potential as the metallic tubular member 50, provides a stress-free interface between tubular member 50 and resilient plug member 120, and thus any air trapped in the interface will not ionize. The interface between the partially conductive portion 178 and the non-conductive portion 176 of resilient member 120, is a voidless, air-free interface, because of the integral bond therebetween. The forcing of the two tapered surfaces 73 and 183 of the first tubular member 48 and resilient plug member 120, respectively, during the step of assembly of the removable fuse portion 34 with receptacle 32, ensures a void-free airless interface along the taper.

End 58 of the second tubular member 50 is the closest live or energized element of the protective fuse apparatus 30 to the grounded casing 14 when electrical bushing 24 is connected to a source of alternating potential, and the removable fuse portion 34 is assembled with receptacle 32. Thus, the highest electrical stresses, indicated by broken lines 190, will be set up between end 58 and the grounded casing. The highest electrical gradients will be immediately adjacent to the relatively sharp end 58. Without the resilient plug member 120, the spacing between end 58 and casing 14 must be such that the electrical gradient will not ionize the surrounding air within the dry well receptacle 32 at the operating voltage and BIL rating of the apparatus. Ionization of the air within the dry well fuse holder must be prevented, as a flashover may occur between end 58 and ground along the inner surface 49 of the first tubular member 48. Thus, as the BIL rating and BIL withstand requirements increase, the axial length of the protective fuse apparatus 30 must increase accordingly, which may require the size and cost of the casing to be increased. Further, increasing the size of the casing increases the amount of liquid dielectric required, which also increases the cost of the protected electrical inductive apparatus.

Resilient plug member 120 displaces all of the air from the highly stressed area, which area is indicated as being within circle 192, replacing the air with an electrical grade rubber which has a very high dielectric strength. The effectiveness of the resilient plug member 120 is clearly illustrated by tests made with, and without, the resilient plug member 120. Test results indicate that the resilient plug member 120 raised the withstand voltage 40 KV, from 135 KV BIL to 175 KV BIL. Thus, for any given rated BIL, and desired factor of safety above the rated value, the resilient plug member 120 enables the distance between end 58 and the casing 14 to be substantially reduced.

While resilient plug member 120 provides an effective air seal in the highly stressed area 192 about end 58 of the first electrical terminal means 86, it does not provide a pressure seal. In other words, while the resilient plug member 120 divides the air space defined by opening 40 into first and second air spaces 194 and 196, respectively, beyond its first and second axial ends 170 and 172, it does not seal the second air space 196 from the first air space 194. Further, cap 150 is constructed such that it does not seal the first end 36 of receptacle 32. Thus, any gases which may be generated during the assembly of the removable fuse portion 34 with receptacle 32, by the operation of fuse 110, or for any other reason, are vented to the outside air, and there is never a pressure differential between the air within the opening 40 of receptacle 32 and the outside air.

Resilient plug member 120 defines air passages which are outside of the highly stressed area 192, with these air passages extending from its second axial end to a location adjacent to the circumferential groove 158 in the insulating rod member 140, when the resilient plug member 120 is disposed in assembled relation with the operating rod 140. For example, as illustrated in FIGS. 1, 4 and 5, the second end 172 of resilient plug member 120 may have a plurality of radially extending slots 200 formed therein which start at its axially extending opening 174 and extend outwardly to a predetermined location, such as the interface between the partially conductive portion 170 and the insulating portion 176. Functionally, slots 200 need extend outwardly only for a dimension sufficient to clear the perimeter of washer member 130. Additional slots 202 are formed in the surface which forms the inside diameter of opening 174, with each slot 200 communicating with a slot 202. Slots 202 extend towards axial end 170 for a predetermined dimension sufficient to communicate with the circumferential groove 158 in the insulating rod member 140. Thus, as illustrated by arrows 204 in FIG. 1, any gases in the second air space 196 will be vented to the outside via slots 200, slots 202, circumferential groove 158, the air spaces located between the four arms of the cruciform cross-sectional configuration of insulting rod member 140, and the air space between end 36 of receptacle 32 and cover 150.

Removable fuse portion 34 is completed by connecting the second electrical contact means 124 to electrode 116 of fuse 110, such as via a suitable metallic adapter 206. The second electrical contact means 124 may include a metallic tubular member formed of a good electrical conductor, such as copper, brass or aluminum, having an inside diameter which snugly fits over the outwardly extending portion of electrode 116. Adapter 206 has an axially extending opening sized to slip over tubular member 124, and set screws 208 may be provided to securely hold the parts in assembled relation. If the second electrical terminal 92 and second electrical contact means 124 are to provide a load-break function, a tubular insulating member 210 formed of an arc extinguishing material is attached to the free end of the tubular electrical contact 124. U.S. Pat. No. 3,628,092, which is assigned to the same assignee as the present application, describes in detail a load-break function, and it will not be repeated herein. The present invention applies equally to protected electric inductive apparatus whether or not the protective fuse portion of the apparatus has load-break capability. Further, when load-break capability is desired, the structures of the load-break conductive and insulating members may be reversed, as pointed out in the hereinbefore-mentioned U.S. Pat. No. 3,628,092, with the probe-like terminal 124 and insulating probe 210 being mounted on the cap 42 of receptacle 32, and with the contact assembly 100 and arc extinguishing hood 104 being carried by the removable fuse portion 34, if desired.

In summary, there has been disclosed new and improved protected electrical inductive apparatus having a dry well type protective fuse assembly associated therewith which provides many advantages over protected electrical inductive apparatus of the prior art. For a given spacing between the closest electrical terminal of the fuse apparatus and the grounded casing of the inductive apparatus, the apparatus of the invention provides a higher BIL withstand voltage. For any given BIL rating, the protective fuse apparatus of the invention may have a shorter axial length than protective fuse apparatus of the prior art, minimizing interference problems between the protective fuse apparatus and the internal components of the electrical inductive apparatus.

I claim as my invention:

1. Protected electric inductive apparatus, comprising:

a metallic casing having primary and secondary electrical bushings and an opening, liquid dielectric means disposed in said casing, electrical winding means disposed in said casing and immersed in said liquid dielectric means, protective fuse apparatus including a tubular receptacle and a removable fuse portion, said receptacle having first and second ends, a wall portion having an inner surface which defines an opening which extends between its ends, means sealing the opening at its second end, and first and second spaced electrical terminals each having portions which are respectively accessible from the inside and outside of said tubular receptacle, means sealingly mounting said receptacle through the opening in said casing, with the first end of the receptacle being accessible outside the casing, and the second end extending into said casing such that at least the first and second spaced electrical terminals are immersed in said liquid dielectric means, means electrically connecting the outer portions of said first and second spaced electrical terminals to a primary bushing and said electrical winding means, respectively, said removable fuse portion having first and second ends, including handle means at the first end and fuse means adjacent to the second end, said removable fuse portion including first and second electrical contact means which engage the inner portions of said first and said electrical terminals, respectively, when the removable fuse portion is in assembled relation with said receptacle, said first electrical terminal having first and second axially spaced ends, with the first end being part of the inner portion of the first electrical terminal, said first end being the closest live element of said protective fuse apparatus to said metallic casing when said primary bushing is connected to a source of electrical potential, providing electrical stresses between said first end and said casing, and a resilient plug member having first and second axially spaced ends, and an axially extending opening extending between its ends, said resilient plug member being mounted on said handle means with its second end immediately adjacent to the first electrical contact means of said removable fuse portion, said resilient plug member including intimately bonded electrically conductive and electrically insulating portions which define electrically conductive and electrically insulating outer surfaces, with the conductive outer surface starting at the second axial end of said plug member and extending for a predetermined dimension towards the first axial end, and with the non-conductive outer surface extending from the termination of the conductive surface to its first axial end, said resilient plug member being dimensioned and positioned on said handle means such that when the removable fuse portion is in assembled relation with said receptacle, the electrically conductive outer surface of said resilient plug member contacts the first electrical terminal and extends past the first axial end thereof, towards the first end of the receptacle, and its electrical insulating outer surface snugly contacts the adjacent inner surface of the wall portion of said receptacle, to effectively continue the first electrical terminal into the electrically conductive portion of said resilient plug member and provide an air-free interface at the intimate bond between the conductive and insulating portions thereof, and between the electrically insulating outer surface and contacting inner surface of a receptacle, said resilient plug member defining first and second air spaces within the receptacle adjacent to its first and second axial ends, respectively, said resilient plug member defining at least one air path between the resilient plug member and said handle means adjacent to its axially extending opening which communicates with said first and second air spaces.

2. The protected electrical inductive apparatus of claim 1 wherein the insulating outer surface of the resilient plug member and the inner surface of the receptacle in contact therewith are cooperatively tapered and dimensioned to compress the resilient plug member when the removable fuse portion is in assembled relation with the receptacle, to ensure an air-free interface.

3. The protected electrical inductive apparatus of claim 1 wherein the removable fuse portion and receptacle cooperatively define an air path from the opening in the tubular receptacle to the air external to the protected electrical inductive apparatus, venting any gases formed within the receptacle to the outside and preventing pressure buildup within the receptacle.

4. The protected electrical inductive apparatus of claim 1 wherein the handle means includes an insulating rod member having first and second ends, with said insulating rod member including a first portion adjacent to its second end having a round cross-sectional configuration, and a second portion starting at the end of the first portion which has a non-round cross-sectional configuration, and an annular groove disposed at the junction between said first and second portions, and wherein the at least one air path defined by the resilient plug member includes an axially extending groove in its inner surface which defines the axially extending opening, with said groove extending from the second end of the resilient plug member to the annular groove in the insulating rod member.

5. The protected electrical inductive apparatus of claim 1 wherein the inner surface of the receptacle which is adjacent to the electrically conductive outer surface of the resilient plug member, and said electrically conductive outer surface, are cooperatively configured to resist disassembly of the removable fuse portion of the receptacle when they are in assembled relation.

6. The protected electrical inductive apparatus of claim 5 wherein the inner surface of the receptacle which is cooperatively configured includes an inner surface of the inner portion of the first electrical terminal.

* * * * *